United States Patent [19]

Wild et al.

[11] Patent Number: 4,594,107
[45] Date of Patent: Jun. 10, 1986

[54] DECORATIVE BURNISH GOLD COMPOSITION

[75] Inventors: Wolfgang Wild; Günter Landgraf, both of Hanau, Fed. Rep. of Germany

[73] Assignee: W. C. Heraeus GmbH, Hanau, Fed. Rep. of Germany

[21] Appl. No.: 733,399

[22] Filed: May 10, 1985

Related U.S. Application Data

[63] Continuation-in-part of Ser. No. 556,846, Dec. 1, 1983, abandoned.

[30] Foreign Application Priority Data

Dec. 8, 1982 [DE] Fed. Rep. of Germany ....... 3245392

[51] Int. Cl.$^4$ ............................................. B06D 3/02
[52] U.S. Cl. .................................. 106/1.13; 106/1.18; 106/1.26; 106/1.28; 106/236
[58] Field of Search ................... 106/1.26, 1.13, 1.18, 106/1.28, 236

[56] References Cited

U.S. PATENT DOCUMENTS 2,842,457 7/1958 Morgan et al. ..................... 117/46
3,163,665 12/1964 Fitch ................................. 106/1.26
4,221,826 9/1980 Baltrushaitis ..................... 106/1.26
4,418,099 11/1983 Cuevas et al. ..................... 106/1.26

FOREIGN PATENT DOCUMENTS 721906 1/1955 United Kingdom .

Primary Examiner—Lorenzo B. Hayes
Attorney, Agent, or Firm—Felfe & Lynch

[57] ABSTRACT

A lead free decorative gold composition containing a flux composed of a mixture of a vanadium compound, rhodium sulforesinate and bismuth resinate is disclosed. The preparation produces a gold decoration firmly adhering to glass and having good mechanical and chemical stability.

8 Claims, No Drawings

DECORATIVE BURNISH GOLD COMPOSITION

This application is a continuation-in-part of application Ser. No. 556,846, filed Dec. 1, 1983, now abandoned.

BACKGROUND OF THE INVENTION

The invention relates to a decorative burnish gold composition containing gold powder and/or sparingly soluble gold compound for the decoration of glasses, especially drinking glasses.

Liquid polishing (burnish) gold, made of gold powder suspended in an oily medium, a flux promoting adhesion to the ceramic body and usually containing bismuth and chromium in the form of the resinate and the sulforesinate, respectively, and rhodium sulforesinate, is a preparation that has long been used in the ceramic industry for gilding (see, for example, F. Chemnitius, Sprechsaal 1927, pp. 182–184).

Instead of gold powder, a polishing gold, which after firing appears first as a dull gold coating, but after polishing becomes a silky, shiny coating, may also contain sparingly soluble gold compounds.

For example, German Pat. No. 1,286,866 discloses polishing gold preparations containing thermally degradable gold mercaptides, and German Pat. No. 2,111,729 discloses screeen printing pastes containing gold(III) sulfide.

In a polishing gold suitable for application to glass, lead borate and bismuth subnitrate are used as flux in one case, and a mixture of rhodium, bismuth and chromium resinates and sulfurated balsam in another, in German Pat. No. 1,286,866.

Additional fluxes contained in polishing gold preparations for glass, ceramic and porcelain consist of lead borosilicate or bismuth compounds (Canadian Pat. No. 546,066), and of lead, bismuth and silicon resinates (British Pat. No. 721,906).

A great number of fluxes are known for other gold and noble metal decorating compositions. For example, in the bright gold preparations described in U.S. Pat. No. 2,842,457 for application to glass and porcelain, bismuth, rhodium and vanadium or chromium resinates and sulforesinates are used. In the preparations described in German Pat. No. 1,421,865 for the production of coatings containing bright noble metal on glass ceramic objects, use is made, for example, of resinates, sulforesinates or alcoholates of a fluxing element. A series of such elements is listed therein.

Polishing golds for application to glass, which permits only relatively low firing temperatures (about 500° to 650° C.), usually contain lead fluxes.

However, inasmuch as a large part of the lead contained in decorating gold coatings goes into solution, as it is indicated by determining the solubility of lead in dilute acetic acid in accordance with DIN Standard 51031, the maximum amount of lead which can be dissolved out of drinking vessels, as established by DIN Standard 51032, is reached or even exceeded in drinking glasses decorated with a relatively narrow gold rim.

SUMMARY OF THE INVENTION

The present invention provides a lead-free decorative burnish (polishing) gold composition containing gold powder and/or gold compound of low solubility, with which decorations firmly adhering to glass and having good mechanical and chemical stability can be made.

The decorative gold composition representing the solution of the problem is characterized in accordance with the invention by the fact that it contains as flux a mixture of a vanadium compound, rhodium sulforesinate and, bismuth resinate and zirconium resinate, and the vanadium content of the flux amounts to 0.5–2% by weight, calculated as vanadium pentoxide with respect to the gold content, and the metal content of the flux amounts to 0.1–0.4% by weight, with respect to the decorative gold composition. It has further been found that a particularly preferred embodiment is that the burnish gold composition results with a $V_2O_5$ content of 0.5 to 2 weight percent, preferably 1.3 to 1.6 weight percent, and the zirconium oxide content of 0.3 to 0.6 weight percent with respect to the gold content. This composition is particularly well suited to producing gold coats on glass wtih good adhesion ability and washing machine stability.

The gold content is about 15 to 30% by weight, as is commonly the case in ready-to-apply decorative gold compositions.

Vanadium resinate, vanadium alcoholates, e.g. vanadium propylates and butylates, or vanadium pentoxide or mixtures of these compounds are the preferred vanadium compounds.

The silky gold plating produced on glass with the decorative gold composition of the invention by firing and then polishing adheres firmly to the glass. It is resistant to abrasion and has good chemical stability. Since this preparation contains no components hazardous to health, it can be used to apply decorations of great area to the rims of drinking glasses.

Decorative gold compositions according to the invention contain as gold component either gold powder or gold compounds of low solubility, whose use in polishing golds is known, examples being gold mercaptides (German Pat. No. 12 86 866) or gold(III) sulfide (German Pat. No. 21 11 729) or also mixtures of gold powder and the above-named gold compounds.

Gold powder and/or sparingly soluble gold compound are suspended together with the mixture of vanadium compound, rhodium sulforesinate, bismuth resinate and zirconium resinate, to which for example chromium resinate, silicon resinate, copper resinate and/or and/or a sparingly soluble bismuth compound such as bismuth borate or bismuth oxide, can be added, in oils and organic solvents commonly used in making decorative gold compositions in liquid to paste form. The amount of sparingly soluble bismuth compound, when used, can range to 2.5% by weight, calculated as bismuth with respect to the decorative gold composition. The combined amount of metal of the other flux metal compounds is preferably in the range from 0.1 to 0.4% by weight with respect to the decorative gold composition.

The amount and nature of these oils and solvents used depend on the manner in which the polishing gold is to be applied to the glass. Thus, application with a brush calls for a relatively fluid preparation, while application by silk screening or by means of a rim decorating machine requires that the preparation be in paste form.

The amount of sparingly soluble bismuth compound in the ready-to-apply decorative gold composition corresponds, if the flux also contains it, to a bismuth content of up to 2.5% by weight of the decorative gold composition.

The decorative gold composition of the invention advantageously contains gold compounds which are soluble in essential oils or organic solvents, such as for example soluble gold sulforesinate or soluble gold mercaptide.

Other noble or base metals, in the form of their resinates, for example, can be added in order to vary the color of the gilding. For example, a polishing gold containing silver carbonate or resinate produces gold decorations of a yellow to greenish yellow appearance, and one containing copper or tin resinate produces reddish gold decorations.

DESCRIPTION OF A PREFERRED EMBODIMENT

The preparation and the application of a decorative gold composition in accordance with the invention is described in the following two examples:

EXAMPLE 1

A liquid decorative gold composition suitable for brush application is obtained by grinding the following components for 48 hours in a ball mill:

| Component | Weight-Percent |
| --- | --- |
| Gold powder | 6 |
| Gold sulforesinate, dissolved in essential oils (30% Au) | 40 |
| Silver sulforesinate, dissolved in essential oils (40% Ag) | 6 |
| Vanadium resinate, dissolved in essential oils (3% vanadium pentoxide) | 10 |
| Rhodium sulforesinate, dissolved in essential oils (5% Rh) | 0.5 |
| Bismuth resinate, dissolved in essential oils (5% bismuth trioxide) | 3 |
| Bismuth borate, ground | 0.5 |
| Solution of colophony in pine oil | 11.5 |
| Cyclohexanol | 2 |
| Xylene | 5 |
| Dibutylphthalate | 2 |
| Trichloroethane | 4 |
| Pine Oil | 9.5 |

The preparation is applied to the rim of a drinking glass by brush, dried, and fired at 560° C. By polishing with a glass brush a gilt decoration is obtained having a silky sheen.

EXAMPLE 2

A liquid decorative gold composition suitable for brush application is obtained by grinding the following components for 48 hours in a ball mill:

| Component | Weight-Percent |
| --- | --- |
| Gold | 9 |
| Gold sulforesinate (50% Au) | 29 |
| Gold (III) sulfide | 3 |
| Silver sulforesinate, dissolved in essential oils (40% Ag) | 7.4 |
| Vanadium n-butylate, dissolved in Pine Oil (3% vanadium pentoxide) | 5 |
| Vanadium pentoxide | 1.5 |
| Rhodium sulforesinate, dissolved in essential oils (5% Rh) | 0.4 |
| Bismuth resinate, dissolved in essential oils (5% bismuth trioxide) | 3 |
| Bismuth borate, ground | 1.5 |
| Colophony | 10 |
| Cyclohexanol | 8 |
| Xylene | 5.2 |
| Pine Oil | 12 |
| Eucalyptus Oil | 5 |

The preparation is applied to the rim of a drinking glass by brush, dried, and fired at 520° C. By polishing with a glass brush a gilt decoration is obtained having a silky sheen.

EXAMPLE 3

A liquid decorative gold composition suitable for brush application is obtained by grinding the following components for 48 hours in a ball mill:

| Component | Weight-Percent |
| --- | --- |
| Gold powder | 6 |
| Gold sulforesinate, dissolved in essential oils (30% Au) | 40 |
| Silver sulforesinate, dissolved in essential oils (40% Ag) | 6 |
| Vanadium resinate, dissolved in essential oils (3% vanadium pentoxide) | 10 |
| Rhodium sulforesinate, dissolved in essential oils (5% Rh) | 0.5 |
| Bismuth resinate, dissolved in essential oils (5% bismuth trioxide) | 3 |
| Bismuth borate, ground | 0.5 |
| Zirconium resinate, dissolved in essential oils (6% zirconium dioxide) | 1 |
| Solution of colophony in pine oil | 11.5 |
| Cyclohexanol | 2 |
| Xylene | 5 |
| Dibutylphthalate | 2 |
| Trichloroethane | 4 |
| Pine Oil | 8.5 |

EXAMPLE 4

A liquid decorative gold composition suitable for brush application is obtained by grinding the following components for 48 hours in a ball mill:

| Component | Weight-Percent |
| --- | --- |
| Gold powder | 9 |
| Gold sulforesinate (50% Au) | 29 |
| Gold(III) sulfide | 3 |
| Silver sulforesinate, dissolved in essential oils (40% Ag) | 7.4 |
| Vanadium n-butylate, dissolved in Pine Oil (3% vanadium pentoxide) | 5 |
| Vanadium pentoxide | 1.5 |
| Rhodium sulforesinate, dissolved in essential oils (5% Rh) | 0.4 |
| Bismuth resinate, dissolved in essential oils (5% bismuth trioxide) | 3 |
| Bismuth borate, ground | 1.5 |
| Zirconium resinate, dissolved in essenntial oils (6% zirconium dioxide) | 1 |
| Colophony | 10 |
| Cyclohexanol | 8 |
| Xylene | 5.2 |
| Pine Oil | 11 |
| Eucalyptus Oil | 5 |

Table 1 shows the adhesion stability as a function of the $V_2O_5$ content and Table 2 the washing machine stability as a function of the zirconium oxide content of the burnished gold.

Adhesion Ability

A burnish gold composed similarly to that described in Example 1 but with different $V_2O_5$ content is—as likewise described in that Example—applied on glass samples and burned in.

To be able to judge the adhesion ability of the bright gold coats obtained after burnishing the said gold coats are manually rubbed with sea sand and then tested visually. At a $V_2O_5$ content of about 1.3 weight percent and higher no wear is observed; the adhesion ability can be regarded as very good (see Table 1, column "wear [%]").

Washing Machine Stability (a) Burnish gold with V
(b) Burnish gold with V+Zr (a) To be able to judge the washing machine stability, the burnished bright samples are subjected to 15 washing cycles ("operating wash cycles") with a commercial dish washing composition ("dish washer agent") in a dish washing machine ("dish washing machine") and then—as described in the paragraph "adhesion stability"—treated with sea sand.

With burnish gold compositions with about 1.3–2 weight percent $V_2O_5$, the washing machine stability is good up to about 15 wash cycles (see Table 1, column "adhesion ability after 15 washings"); after 20 wash cycles, however, none of the samples is scratchproof any longer, after 30 wash cycles none of the samples is wipeproof any longer, and after 35 wash cycles no gold is left any longer.

(b) A burnish gold composed similarly to that described in the new Example 1 with a $V_2O_5$ content of 1.6 weight percent but with different $ZrO_2$ content is—as described—applied on glass samples and burned in. The burnished bright samples are subjected to 50 wash cycles with a commercial dish washing agent in a dish washing machine and then—as described in the paragraph "adhesion stability"—treated with sea sand.

As Table 2 shows, with a $ZrO_2$ content of about 0.3–0.6 weight percent at a $V_2O_5$ content of about 1.6 weight percent the best washing machine resistance is achieved.

TABLE 1

| $V_2O_5$ content (weight %) | Wear (%) | Adhesion ability after 15 washings |
| --- | --- | --- |
| 0 | 90 | — |
| 0.4 | 30 | not washed off, not scratchproof |
| 0.5 | 20 | not washed off, not scratchproof |
| 0.8 | 10 | not washed off, not scratchproof |
| 1.3 | 0 | not washed off, scratchproof |
| 1.6 | 0 | not washed off, scratchproof |
| 2.0 | 0 | not washed off, scratchproof |
| 2.5 | 0 | 10% washed off, not scratchproof |
| 3.0 | 0 | 30% washed off, not scratchproof |

TABLE 2

| $ZrO_2$ content (weight %) | Adhesion ability after 50 washings |
| --- | --- |
| 0 | all washed off |
| 0.15 | not washed off, not scratchproof |
| 0.3 | not washed off, scratchproof |
| 0.6 | not washed off, scratchproof |
| 1.0 | not washed off, not scratchproof |

It will be understood that the specification and examples are illustrative but not limitative of the present invention and that other embodiments within the spirit and scope of the invention will suggest themselves to those skilled in the art.

German Pat. No. 1 421 865

Fluxing elements listed therein: Al, Sb, Ba, Bi, B, Cd, Ca, Ce, Cr, Co, Cu, Ga, Ge, In, Fe, La, Pb, Li, Mg, Mn, Mo, Nd, Ni, Nb, P, K. Pr, Re, Si, Na, Sr, Ta, Sn, Ti, W, U, V, Y, Zn, Zr.

We claim:

1. In a lead-free decorative burnish gold composition for the decoration of glass, comprising gold powder, a sparingly soluble gold compound or mixtures thereof and a flux; the improvement comprising, as the flux; a mixture of rhodium sulforesinate, bismuth resinate, zirconium resinate and a vanadium compound selected from the group consisting of vanadium resinates, vanadium alcoholates, vanadium pentoxide or mixtures thereof, wherein the vanadium content is 0.5–2 weight percent, calculated as vanadium pentoxide and the zirconium content is 0.3–0.6 weight percent calculated as zirconium dioxide with respect to the gold content, the flux having a metal content of 0.1–0.4 percent by weight of the composition.

2. The decorative gold composition of claim 1, wherein the amount of sparingly soluble bismuth compound is up to 2,5 weight-percent calculated as bismuth with respect to the decorative gold composition.

3. The decorative gold composition of claim 1, further comprising silver resinate.

4. The decorative gold composition of claim 1, further comprising a soluble gold compound.

5. The decorative gold composition of claim 1, wherein the glass is a drinking glass.

6. The decorative gold composition of claim 1, wherein the flux additionally contains a sparingly soluble bismuth compound.

7. The decorative gold composition of claim 1, wherein the vanadium content is 1.3 to 1.6 weight percent calculated as vanadium pentoxide with respect to the gold content.

8. The decorative gold composition of claim 1, wherein the vanadium compound is a vanadium alcoholate selected from the group consisting of vanadium propylates and vanadium butylates.

* * * * *